(12) United States Patent
Runge

(10) Patent No.: US 6,695,296 B1
(45) Date of Patent: Feb. 24, 2004

(54) SHOCK AND VIBRATION ISOLATION MOUNT WITH VARIABLE THICKNESS SUPPORT SECTION

(75) Inventor: Samuel A. Runge, Tucson, AZ (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/986,355

(22) Filed: Nov. 8, 2001

Related U.S. Application Data
(60) Provisional application No. 60/247,549, filed on Nov. 9, 2000.

(51) Int. Cl.⁷ .................................................. F16F 1/18
(52) U.S. Cl. ........................ 267/160; 267/153; 248/628
(58) Field of Search .............................. 267/30, 41, 42, 267/43, 44, 45, 158, 160, 164, 152, 153; 248/628, 626, 618, 638, 603, 604

(56) References Cited

U.S. PATENT DOCUMENTS

| | | | |
|---|---|---|---|
| 1,184,565 A | * 5/1916 | Parks ........................ 267/271 |
| 1,730,168 A | 10/1929 | Schiffmann |
| 2,018,180 A | 10/1935 | Lawton |
| 2,154,586 A | * 4/1939 | Stern ........................ 267/140.4 |
| 2,492,965 A | * 1/1950 | Carr ........................ 244/108 |
| 2,546,268 A | * 3/1951 | Legris ........................ 267/158 |
| 2,689,464 A | 9/1954 | Wurtz |
| 2,893,665 A | 7/1959 | Paulsen |
| 2,913,215 A | 11/1959 | Kerley, Jr. et al. |
| 2,965,349 A | * 12/1960 | Hutton ........................ 188/129 |
| 3,066,905 A | 12/1962 | Gertel |
| 3,677,017 A | 7/1972 | Shirvany |
| 3,727,940 A | * 4/1973 | Hug ........................ 280/124.146 |
| 3,814,410 A | * 6/1974 | Fukui et al. ........................ 267/47 |
| 4,172,590 A | 10/1979 | Jarret et al. |
| 4,183,494 A | * 1/1980 | Cleveland ........................ 248/567 |
| 4,735,403 A | * 4/1988 | Matsumoto et al. ........ 267/180 |
| 4,752,058 A | 6/1988 | Weber |
| 4,763,885 A | * 8/1988 | Zamitter ........................ 267/158 |
| 4,781,365 A | * 11/1988 | Harrison ........................ 267/294 |
| 4,869,479 A | * 9/1989 | Colonel et al. ........................ 267/141 |
| 4,934,724 A | * 6/1990 | Allsop et al. ........................ 248/598 |
| 4,964,624 A | 10/1990 | Ciolczyk |
| 5,102,107 A | * 4/1992 | Simon et al. ........................ 248/621 |
| 5,167,396 A | 12/1992 | Burba et al. |
| 5,217,183 A | * 6/1993 | Liautaud ........................ 244/100 R |
| 5,217,198 A | 6/1993 | Samarov et al. |
| 5,232,061 A | * 8/1993 | Neeleman ........................ 177/184 |
| 5,259,599 A | * 11/1993 | Hernandez ........................ 267/180 |
| 5,358,210 A | 10/1994 | Simon et al. |
| 5,429,338 A | 7/1995 | Runge et al. |
| 5,676,354 A | * 10/1997 | Okutsu et al. ........................ 267/158 |
| 5,802,914 A | * 9/1998 | Fassler et al. ........................ 267/158 |
| 5,897,093 A | * 4/1999 | Le Derf ........................ 248/570 |
| 6,164,023 A | * 12/2000 | Horikiri et al. ........................ 248/562 |
| 6,254,070 B1 | 7/2001 | Runge |
| 6,427,990 B1 | * 8/2002 | Hartmann ........................ 267/103 |

FOREIGN PATENT DOCUMENTS

| | | |
|---|---|---|
| EP | 0 450 252 A1 | 10/1991 |
| WO | 99/01678 | 1/1999 |

* cited by examiner

*Primary Examiner*—Jack Lavinder
*Assistant Examiner*—Benjamin A Pezzlo
(74) *Attorney, Agent, or Firm*—Hunton & Williams

(57) ABSTRACT

A shock absorption mount has is generally C-shaped and has a top section, a bottom section, and a supporting section. The top section contacts an equipment mounting surface, while the bottom section contacts a foundation. The supporting section includes-an inclining section, an intermediate middle section, and a declining section. Preferably, the inclining section is a linearly inclining section and the declining section is a linearly declining section. The intermediate middle section has a curvilinear shape that has an elliptical inner segment and a circular outer segment. Preferably, the shock absorption mount is constructed of an elastomeric material having a flexural modulus in the range of about 10 and 100 ksi, a breaking strain greater than about 400%, and a yield strain greater than about 10%.

18 Claims, 2 Drawing Sheets

SHOCK AND VIBRATION ISOLATION MOUNT WITH VARIABLE THICKNESS SUPPORT SECTION

RELATED APPLICATIONS

This application asserts priority to U.S. Provisional Application No. 60/247,549, entitled "Shock and Vibration Isolation Mount," which was filed on Nov. 9, 2000 in the name of Samuel A. Runge, and which is hereby incorporated by reference in its entirety.

FIELD OF THE INVENTION

The present invention relates generally to a shock absorption mount for use in supporting and protecting equipment, such as sensitive electronic equipment installed on an aircraft, a ship, or a submarine.

BACKGROUND OF THE INVENTION

Traditionally, the U.S. Government and other governments have required that electronic equipment and other sensitive equipment used aboard military vessels, such as aircraft, ships, and submarines, be specifically designed and manufactured so as to withstand these vessels' challenging operational environments. Accordingly, suppliers have had to specially "ruggedize" or "militarize" equipment in order to satisfy certain testing criteria, such a shock testing and/or vibration testing.

Unfortunately, such militarized equipment has two significant drawbacks. First, specially designing each piece of equipment to withstand challenging operational environments can impose significant costs. Second, because each piece of equipment must be specially designed to meet testing criteria, the deployment of state-of-the-art technologies can be significantly delayed. For instance, an improved flat screen display technology may be readily available for commercial applications, but it may be years before the technology can be incorporated into military equipment.

As a result of these and other drawbacks of so-called "MIL-SPEC" equipment, since the early 1990's the Department of Defense has issued various directives permitting and, in fact, encouraging, utilization of so-called "commercial-off-the-shelf" (COTS) technology. As a result, military vessels have been increasingly using COTS electronic components and systems in lieu of militarized equipment. COTS equipment is cheaper, it offers the latest technology, and in many instances, it offers a larger pool of suppliers from which the Government (or its prime contractors) can select.

One challenge presented by COTS equipment relates to its ability to pass shock and vibration requirements. Militarized equipment has traditionally been rigidly mounted to shipboard structures. However, COTS equipment tends to have limited capabilities to withstand shock and vibration motions, and, therefore, tends to be unsuitable for being rigidly mounted to shipboard structures. Therefore, COTS equipment usually requires isolation devices (shock mounts) to mitigate the effects of shock and vibration presented in the operational environment.

Typically, COTS equipment is placed in component racks that are coupled to a vessel structure (e.g., floor or wall) via one or more shock absorption mounts. Sometimes, individual pieces of equipment are coupled to the vessel structure via shock absorption mounts. Sometimes, COTS equipment is placed on flat platforms that, in turn, are coupled to the vessel structure, using shock absorption mounts.

Prior to deployment, equipment proposed for military vessel use is subjected to a standard series of tests. For example, the equipment may be subjected to an underwater explosive shock test (e.g., performed in accordance with MIL-S-901D) that can result in the transmission of more than one-hundred G's of mechanical acceleration. The equipment may also be subjected to a vibration test (e.g., performed in accordance with MIL-STD-167-1) that may subject the equipment to as much as 1.25 G's of acceleration and frequencies as, high as 50 Hertz.

COTS equipment affixed to some shock absorption mounts of the prior art, such as wire cable mounts, has failed shock testing due to insufficient mechanical damping as well as a lack of available deflection capability. Some shock absorption mounts of the prior art are also heavy and difficult to install. In addition, equipment affixed to some shock mounts of the prior art has failed vibration testing.

It is postulated that prior art shock mounts may have failed vibration testing for several reasons. First, a shock mount disposed between and affixed to a base structure and a piece of equipment forms an oscillator that is subject to resonant amplification of the base structure vibratory motion at the resonant frequency of the oscillator. Some shock mounts of the prior art have insufficient damping to maintain this resonant amplification at acceptable levels.

Second, some mounts of the prior art have a significantly high characteristic ratio of. vibratory resonant frequency to shock resonant frequency. Some mounts of the prior art exhibit a ratio of vibratory to shock resonant frequency of 1.4 or greater and thus exhibit excessively high vibratory resonant frequencies. Because the vibratory acceleration level at resonance is directly proportional to the square of the vibratory frequency, an increase in the vibratory resonant frequency of just a few Hertz can greatly increase the acceleration transmitted at resonance.

In sum, there is an increasing need for high performance shock mounts for the protection of sensitive equipment. While this discussion has focused on the needs of the military in this regard, it can readily be appreciated that a high performance shock mount may find application in other contexts, such as in nuclear power facilities or other facilities using sensitive electronic equipment.

SUMMARY OF THE INVENTION

An embodiment of the present invention comprises a generally C-shaped shock absorption mount that has a top section, a bottom section, and a supporting section. The top. section contacts an equipment mounting surface, while the bottom section contacts a foundation. The supporting section includes an inclining section, an intermediate middle section, and a declining section. The intermediate middle section has a curvilinear shape that has an elliptical inner segment and a circular outer segment.

According to one aspect of the invention, the inclining section is made up of a first substantially straight section and a second substantially straight section. The first substantially straight section defines an angle with respect to the ground plane defined by the bottom section. The second substantially straight section is approximately parallel to the ground plane. The declining section is made up of a third substantially straight section and a fourth substantially straight section. The third substantially straight section defines the same angle as the first substantially straight section, and the fourth substantially straight section is also approximately parallel to the ground plane.

According to another aspect of the invention, the shock absorption mount is constructed of an elastomeric material (or "elastomeric" having a flexural modulus in the range of about 10 to 100 ksi, a breaking strain greater than about 400%, and a yield strain greater than about 10% Preferably, the elastomeric is damped using a damping agent.

Accordingly, it is one object of the present invention to overcome one or more of the aforementioned and other limitations of existing systems and methods for providing shock and vibration isolation for COTS equipment.

It is another object of the invention to provide a shock absorption mount that attenuates shock excitations to acceptable levels.

It is another object of the invention to provide a shock absorption mount that attenuates vibration excitations to acceptable levels.

It is another object of the invention to provide a shock absorption mount that has a vibratory resonant frequency that is not significantly above the shock resonant frequency.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist.

Additional features and advantages of the invention will be set forth in the description that follows, and in part will be apparent from the description, or may be learned by practice of the invention. The objectives and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which.

DETAILED DESCRIPTION OF THE INVENTION

Figure 1:
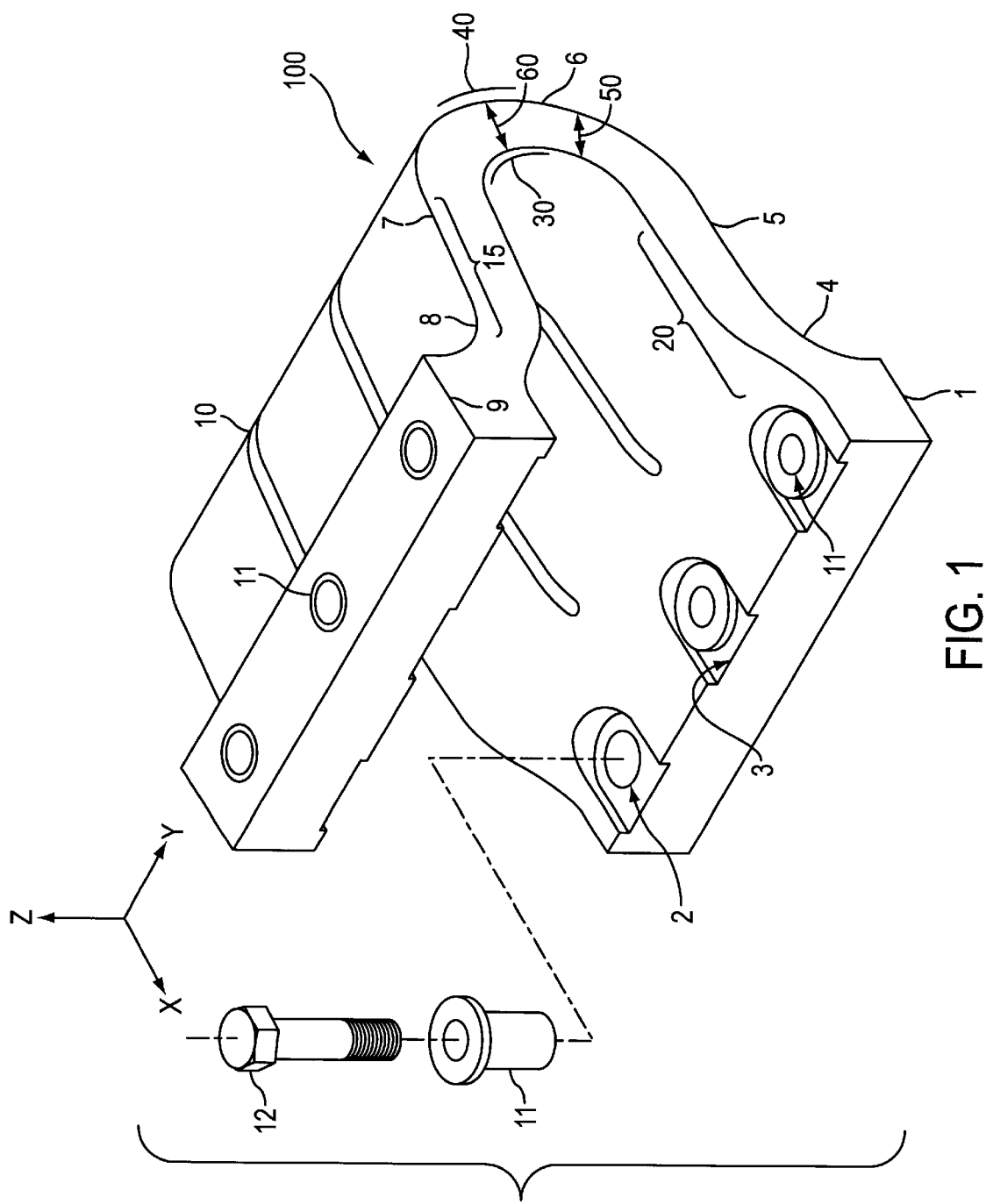
FIG. 1 is an isometric view of a shock mount according to an embodiment of the invention.

FIG. 1 is an isometric view of a shock absorption mount 100 according to an embodiment of the invention. In accordance with FIG. 1, the shock absorption mount 100 is generally C-shaped and includes top section 9, declining section 15, intermediate middle section 6, inclining section 20, and bottom section 1. Collectively, declining section 15, intermediate middle section 6, and inclining section 20 comprise a supporting section that supports equipment and absorbs energy from shock inputs and vibration inputs.

Preferably, declining section 15 and inclining section 20 are substantially linear such that they comprise linearly declining section 15 and linearly inclining section 20, respectively.

Top section 9 contacts an equipment mounting surface, such as the bottom of an equipment rack or the bottom of a discrete piece of equipment. Bottom section 1 contacts a foundation, such as the deck or floor of a vessel (e.g., a ship) or another flat, secure surface. Top section 9 and bottom section 1 are secured by attaching fasteners 12 through metallic inserts 11, which in turn are seated in recesses 3 through apertures 2.

Fasteners 12 may comprise an article capable of fixably attaching shock absorption mount 100 to a surface. Accordingly, fasteners 12 may comprises bolts, rivets, screws, and so forth. Preferably, fasteners 12 are bolts. Metallic inserts 11 prevent fasteners 12 from wearing away or damaging the material used to construct shock absorption mount 100. To suit the application of the mount in these environments, the preferred material of the metallic inserts 11 is a corrosion resistant metal such as stainless steel.

Recesses 3 comprise recesses in shock absorption mount 100 that are used to provide additional clearance for conditions which cause shock absorption mount 100 to deflect along the z-axis. In particular, recesses 3 provide additional clearance before there is any contact between the heads of reciprocal fasteners 12 in top section 9 and bottom section 1 when the mount is under a significant load along the z-axis.

According to one embodiment, linearly inclining section 20 includes a first. substantially straight section 4 and a second substantially straight section 5. A first end of first substantially straight section 4 connects to bottom section 1, while a second end of first substantially straight section 4 connects to a first end of second substantially straight section 5. According to this embodiment, linearly declining section 15 includes a third substantially straight section 8 and a fourth substantially straight section 7. A first end of third substantially straight section 8 connects to top section 9, while a second end of third substantially straight section 8 connects to a first, end of fourth substantially straight section 7. Preferably, there is some rounding between the aforementioned sections in order to provide a smooth transition therebetween.

Preferably, first substantially straight section 4 and third substantially straight section 8 define an angle with respect to the base plane defined by the contact of bottom section 1 with a foundation. Preferably, second substantially straight section 5 and fourth substantially straight section 7 are approximately parallel to this base plane.

Intermediate middle section 6 has a curvilinear shape that results from a novel configuration. Specifically, intermediate middle section includes an elliptical inner segment 30 and a circular outer segment 40. It is believed that this unique configuration provides a more resilient mount than alternative curvilinear configurations, such as one defined by a circular inner segment and a circular outer segment. As a result of the unique configuration of the present invention, intermediate middle section 6 has a nonuniform wall thickness 50. In particular, intermediate middle section 6 includes a nose portion 60 (at about the middle of intermediate middle section 6) that has a greater wall thickness 50 than at other points along the profile defined by intermediate middle section 6.

Shock absorption mount 100 is constructed of a resilient elastomeric material. Preferably, this material has a flexural modulus in the range of about 10 td about 100 ksi, a breaking strain greater than about 400%, and a yield strain greater than about 10% A suitable elastomeric is known as Hoechst-Celanese-Ticona Corporation brand Riteflex®. Riteflex® provides the required range of mechanical properties and is impervious to degradation by chemical elements of typical marine and industrial environments. Preferably, Riteflex® 655 is used to construct shock absorption mount 100. Preferably, this elastomeric material is damped by alloying it with a damping agent. A suitable damping agent is DOW® Pellethane™2102–55D at about a 25% ratio to the elastomeric material (such as Riteflex® 655).

According to an embodiment, shock absorption mount 100 further includes a plurality of slots 10 that are generally parallel to the cross-section of shock absorption mount 100 (i.e., the cuts are made along the x-axis). Slots 10 may be employed to reduce the transverse (i.e., along the y-axis) stiffness of shock absorption mount 100 to a value that is about equal to the stiffness along the x-axis.

Figure 2:
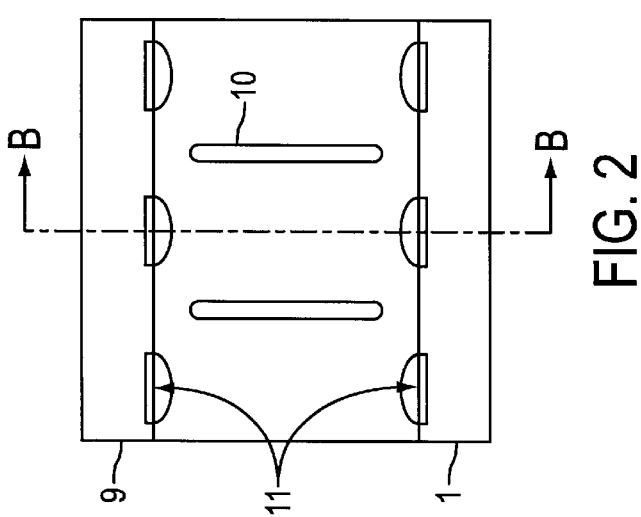
FIG. 2 is a front view of a shock mount according to an embodiment of the invention.

FIG. 2 is a front view of a shock mount 100 according to an embodiment of the invention, depicting top section 9, recesses 11, slots 10, and bottom section 1.

Figure 3:
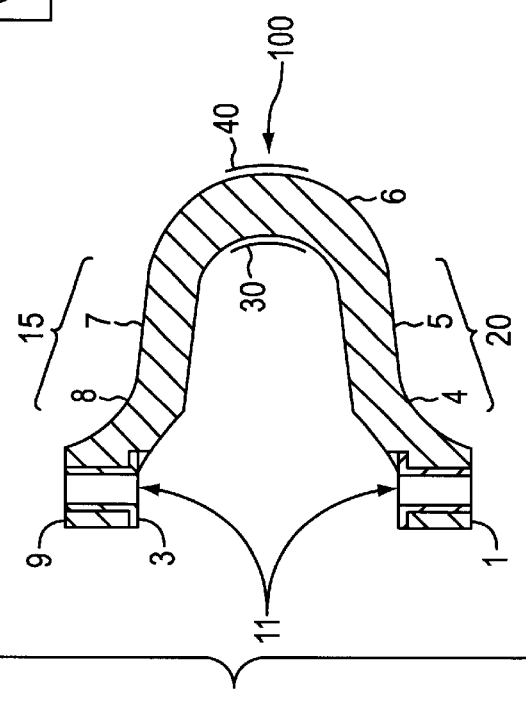
FIG. 3 is a cross-sectional side view of a shock mount according to an embodiment of the invention.

FIG. 3 is a cross-sectional side view taken through the plane 2-B of the shock absorption mount 100 depicted in FIG. 2. As shown in FIG. 3, inclining section 20 is comprised of first straight section 4 and second straight section 5. Declining section 15 is comprised of third straight section 8 and fourth straight section 7. As can be seen, first straight section 4 and third straight section 8 define a first angle with respect to the ground plane that is significantly greater than the second angle defined by second straight section 5 and fourth straight section 7. The second angle is such that second straight section 5 and fourth straight section 7 are nearly parallel to the ground plane.

FIG. 3 also illustrates the elliptical inner segment 30 and circular outer segment 40 that render an intermediate middle segment 6 that is slightly thicker at its nose than at either side of the nose.

FIG. 3 also illustrates how metallic inserts 11 are seated in recesses 3 so as to provide additional clearance. This additional clearance is important because top section 9 and bottom section 1 are not offset along the x-axis.

Figure 4:
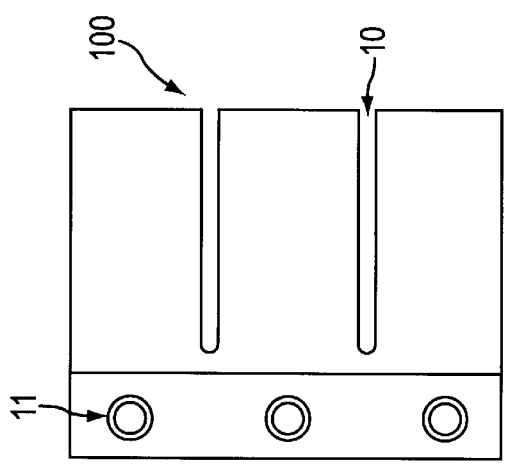
FIG. 4 is a top view of a shock mount according to an embodiment of the invention.

FIG. 4 is a top view of a shock mount according to an embodiment of the invention. FIG. 4 illustrates slots 10 employed in the preferred embodiment of the invention.

Testing has been performed in order to ascertain the performance characteristics of a shock absorption mount developed in accordance with the present invention. The shock absorption mount has demonstrated the capability to tolerate loads in the range of about 15 to 850 pounds (collectively, for the various embodiments having different size mounts).

The drift (e.g., along the z-axis) has been limited to about 0.25 inches. Acceleration at resonance during MWL-STD-167-1 tests has been limited to about 1.5 G's. Acceleration during MIL-STD-901D shock tests using a 12–16 Hertz deck simulation fixture has been limited to about 15 G's.

According to one embodiment, shock absorption mount 100 is about 7.5 inches wide (along the y-axis) and about 7.0 inches high (from the top of top section 9 to the bottom of bottom section 1 along the z-axis). Each of the top section 9 and the bottom section 1 is about 1.5 inches deep along the x-axis. Two slots 10 are included in this embodiment. In this embodiment, shock absorption mount 100 can tolerate a static deflection of about 0.4 inches and a dynamic deflection of about 4.0 inches. In this embodiment, shock absorption mount 100 exhibits a natural shock frequency and a natural vibration frequency in the range of 5–7 Hertz. A maximum drift of about 0.25 inches is exhibited.

According to a second embodiment, shock absorption mount 100 is about 3.75 inches wide (along the y-axis) and about 5.0 inches high (from the top of top section 9 to the bottom of bottom section 1 along the z-axis). Each of the top section 9 and the bottom section 1 is about 1.0 inches deep along the x-axis. One slot 10 is included in this embodiment. In this embodiment, shock absorption mount 100 can tolerate a static deflection of about 0.2 inches and a dynamic deflection of about 3.0 inches. In this embodiment, shock absorption mount 100 exhibits a natural shock frequency and a natural vibration frequency in the range of 8–9 Hertz. A maximum drift of about 0.1 inches is exhibited.

The shock absorption mount of the present invention achieves shock and vibration attenuation through the above-described novel geometric configuration and material composition. The geometric configuration and material composition is capable of providing an approximate equality of vibratory resonant frequency and shock resonant frequency. The disclosed shock absorption mount demonstrates superior performance in shock and vibration attenuation and is susceptible to manufacture in quantity.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

What is claimed is:

1. A shock absorption mount, comprising:
   a generally C-shaped unibody of resilient material having a resilient top section, a resilient bottom section, and a supporting section;
   the C-shaped unibody having an open end and a closed end;
   the top section being adapted to contact an equipment mounting surface and the bottom section being adapted to contact a foundation;
   wherein the supporting section includes an inclining section, an intermediate middle section, and a declining section, the intermediate middle section contacting the inclining section at one end and the declining section at the other end; and
   wherein the intermediate middle section has a curvilinear shape defined by an elliptical inner segment and a circular outer segment; thereby defining a concave cross-section in the vertical plane that is elliptical on one side and circular on the other side.

2. The shock absorption mount of claim 1, wherein the intermediate middle section has a nose portion that is thicker relative to other points along the profile defined by the intermediate middle section.

3. The shock absorption mount of claim 1, wherein the inclining section includes a first substantially straight section and a second substantially straight section, wherein a first end of the first substantially straight section contacts the bottom section, wherein a second end of the first substantially straight section contacts a first end of the second substantially straight section, and wherein a second end of the second substantially straight section contacts a bottom end of the intermediate middle section, wherein the declining section includes a third substantially straight section and a fourth substantially straight section, a first end of the third substantially straight section contacts the top section, wherein a second end of the third substantially straight section contacts a first end of the fourth substantially straight section, and wherein a second end of the fourth substantially straight section contacts a top end of the intermediate middle section.

4. The shock absorption mount of claim 3, wherein the first substantially straight section defines an angle with respect to a plane defined by the contact of the bottom section with the foundation, and wherein the third substantially straight section defines substantially the same angle with respect to the plane.

5. The shock absorption mount of claim 4, wherein the second substantially straight section and the fourth substantially straight section are substantially parallel to the plane.

6. The shock absorption mount of claim 1, wherein the resilient material comprises an elastomeric having a flexural modulus in the range of about 10 to about 100 ksi, a breaking strain greater than about 400%, a yield strain greater than about 10%, and further wherein the elastomeric is damped using a damping agent.

7. The shock absorption mount of claim 1, wherein the top section has a lower interior portion having top recesses for receiving top fasteners, and wherein the bottom section has an upper interior portion having bottom recesses for receiving bottom fasteners.

8. The shock absorption mount of claim 1, wherein the intermediate middle section includes a plurality of slots, wherein the plurality of slots are generally parallel to a cross-section of the shock absorption mount, and wherein the plurality of slots are operative to make a transverse stiffness of the shock absorption mount approximately equal to the stiffness of the shock absorption mount along a perpendicular direction in the horizontal plane.

9. A shock absorption mount for mounting equipment on a base structure, comprising:

a top section;

a linearly declining section;

an intermediate middle section;

a linearly inclining section;

a bottom section;

wherein the top section, the linearly declining section, the intermediate middle section, the linearly inclining section, and the bottom section sequentially join together to form a substantially C-shaped mount constructed out of an elastomeric material;

the C-shaped mount having an open end and a closed end;

and wherein the intermediate middle section has a curvilinear shape defined by an elliptical inner segment and a circular outer segment; thereby defining a concave cross-section in the vertical plane that is elliptical on one side and circular on the other side.

10. The shock absorption mount of claim 9, wherein the top section, the linearly declining section, the intermediate middle section, the linearly inclining section, and the bottom section cooperate to render a vibratory resonant frequency that is approximately equal to a shock resonant frequency.

11. The shock absorption mount of claim 10, wherein the shock resonant frequency is about 5 Hertz.

12. The shock absorption mount of claim 10, wherein a wall thickness of the intermediate middle section is at a maximum at the nose of the intermediate middle section.

13. The shock absorption mount of claim 10, wherein the elastomeric material has a flexural modulus in the range of about 10 to about 100 ksi, a breaking strain greater than about 400%, and a yield strain greater than about 10%.

14. The shock absorption mount of claim 13, wherein the elastomeric material is damped using a damping agent.

15. The shock absorption mount of claim 10, wherein the linearly inclining section includes a first substantially straight section and a second substantially straight section, wherein a first end of the first substantially straight section contacts the bottom section, wherein a second end of the first substantially straight section contacts a first end of the second substantially straight section, and wherein a second end of the second substantially straight section contacts a bottom end of the intermediate middle section, wherein the linearly declining section includes a third substantially straight section and a fourth substantially straight section, a first end of the third substantially straight section contacts the top section, wherein a second end of the third substantially straight section contacts a first end of the fourth substantially straight section, and wherein a second end of the fourth substantially straight section contacts a top end of the intermediate middle section.

16. The shock absorption mount of claim 15, wherein the first substantially straight section defines an angle with respect to a plane defined by the bottom section, and wherein the third substantially straight section defines the angle with respect, to the plane, and wherein the second substantially straight section and the fourth substantially straight section are substantially parallel to the plane.

17. The shock absorption mount of claim 16, wherein the top section includes a lower interior portion having top recesses for receiving top fasteners, and wherein the bottom section has an upper interior portion having bottom recesses for receiving bottom fasteners.

18. The shock absorption mount of claim 17, wherein the intermediate middle section includes a plurality of slots, wherein the plurality of slots are generally parallel to a cross-section of the shock absorption mount, and wherein the plurality of slots are operative to provide a transverse stiffness of the shock absorption mount that is approximately equal to a stiffness along the other axis in the horizontal plane.

\* \* \* \* \*